United States Patent [19]
Smith

[11] Patent Number: 5,287,085
[45] Date of Patent: Feb. 15, 1994

[54] AUTOMATIC TEST AND CONNECT ELECTRICAL POWER SYSTEM FOR ANTI-LOCK AND CONVENTIONAL BRAKE EQUIPPED TRAILERS

[75] Inventor: Richard W. Smith, Salem, Ohio
[73] Assignee: At-A-Glance, Inc., Salem, Ohio
[21] Appl. No.: 935,204
[22] Filed: Aug. 26, 1992
[51] Int. Cl.$^5$ ............................................ B60Q 1/00
[52] U.S. Cl. .................................................... 340/438
[58] Field of Search ................ 73/121, 129; 340/453, 340/348, 463; 439/34-36

[56] References Cited
U.S. PATENT DOCUMENTS

| | | |
|---|---|---|
| 3,934,940 | 1/1976 | Schnalbel . |
| 4,842,532 | 6/1989 | Krause .................................. 439/35 |
| 5,039,173 | 8/1991 | Emig et al. . |
| 5,085,489 | 2/1992 | Emig et al. . |

*Primary Examiner*—Robert Raevis
*Attorney, Agent, or Firm*—Frederic E. Naragon

[57] ABSTRACT

An automatic test and connect electrical power system for use on a brake light circuit of a multiple circuit cord and plug configuration disposed between a tractor and trailer or trailers to sense the presence of a trailer or trailers equipped with either a conventional brake system or an anti-lock brake system and to automatically connect and provide continuous or intermittent power to the electronic control unit and light the brake lights of a trailer equipped with either brake system when the brakes of the tractor are applied lighting the brake lights of the tractor.

3 Claims, 1 Drawing Sheet

AUTOMATIC TEST AND CONNECT ELECTRICAL POWER SYSTEM FOR ANTI-LOCK AND CONVENTIONAL BRAKE EQUIPPED TRAILERS

BACKGROUND OF THE INVENTION

This invention relates in general to a system for automatically testing the type of brake system on a trailer employed in tractor/trailer vehicles and upon determination of the type of system with which the trailer is equipped, will properly and automatically connect the vehicle power source to the tractor/trailer. It is generally known that in the mid 1970's anti-lock brakes on heavy tractor/trailer vehicles were mandated under Federal Motor Vehicle Safety Standard 121 and that a few years later the mandate was rescinded by Congress because of the failure rate of the unproven anti-lock brake systems of that day. Since that time, new technology has restored credibility to anti-lock brake systems around the world.

Anti-lock brake systems on tractors typically receive continuous power from a self-contained power supply disposed within the tractor. However, power to operate trailer anti-lock brakes is typically derived from the trailer brake light circuit which is powered through a cord/connector system suspended between the tractor and trailer. This cord/connector system generally consists of six or seven individual conductors or lines each one dedicated to a particular circuit function such as turn signal, tail lights, brake lights, and identification marker lights, etc. Power supplied to the trailer anti-lock brake system from the trailer brake light circuit is intermittent being supplied only when the brakes of the tractor are applied. While today's well designed second generation anti-lock brake systems function acceptably with this method of powering on single trailer applications, it is generally agreed among designers and engineers that continuous power to the anti-lock brake system is a better and safer mode of operation especially when operating a double or triple trailer combination. Under continuous power, self-diagnostics can also be performed continuously on the anti-lock brake system thereby enhancing the reliability and safe operation of the overall system. In addition, voltage drop problems associated with multiple trailer configurations are minimized.

Applicant filed pending patent application entitled Anti-Lock Brake Powering System on May 21, 1992, Ser. No. 07/886,252, for an anti-lock brake powering system that will operate in conjunction with the present invention. In Applicant's pending patent application an additional pressure responsive switch is positioned in the relay valve at the rear of the trailer and is disposed in the trailer brake light circuit and is responsive to air pressure in the trailer air brake lines. In addition, a switch means is disposed in the tractor and is connected to the trailer brake light circuit so that when the switch means is placed in one position the existing electrical brake light circuit in the tractor functions normally to operate the brake lights of a conventional (non-anti-lock brake equipped) trailer from the pressure responsive switch disposed in the tractor. With the switch means placed in a second position, continuous power is supplied to the brake light circuit of a trailer equipped with an anti-lock brake system and the trailer brake lights operate from the pressure responsive switch disposed in the trailer relay valve. Thus, the existing standard seven way cord and plug configuration as is presently employed in most tractors can be utilized to power a trailer equipped with either a conventional brake system or an anti-lock brake system.

Some examples of prior art anti-lock testing and brake powering systems are set forth in patents briefly described below:

U.S. Pat. No. 5,039,173 issued to Emig et al. discloses a system incorporating a separate battery located on the trailer which in combination with the tractor power source provides power to the electronic control unit and solenoids of the anti-lock brake system. This system requires the use of an additional battery which has encountered charging difficulties in actual field use and requires periodic maintenance. Additionally, there is high initial expense to implement such a system.

U.S. Pat. No. 5,085,489 issued to Emig et al. discloses a system which partially powers the electronic control unit of an anti-lock system by utilizing power generated by wheel sensors. Power is supplied only when the wheels of the trailer are moving above a minimum speed and is insufficient to operate solenoid valves in the system. Wheel sensors must be precisely set and are susceptible to mechanical failure.

U.S Pat. No. 3,934,940 issued to Schnalbel discloses a safety interlock circuit for switching brake anti-lock systems in a tractor/trailer vehicle combination in and out. A current sensing device located in the tractor unit senses the differential of current flow into an anti-lock trailer as opposed to a non-anti-lock trailer equipped with a load resistor. Based on this difference, a control circuit enables or disables the tractor anti-lock brake system so as to provide similar braking characteristics for both vehicles. This devise operates in conjunction with a dedicated line that supplies continuous power to the anti-lock trailer such as is common in the European market and is not applicable to trailers in the North American market. This device will enable or disable tractor anti-lock according to the type of trailer connected to it which is not the object of the present invention.

Whatever the precise merits, features and advantages of the aforecited references, none fulfills the purpose of the present invention.

The present invention allows the continued use of the standard six or seven way cord and plug configuration presently used on tractor/trailer combinations while simultaneously providing continuous electrical power to the anti-lock brake system of a trailer.

A further object of the present invention is to automatically test a trailer to determine whether the trailer is equipped with anti-lock or conventional brakes.

Still another object of the present invention is to automatically connect the proper power source to the trailer brake light circuit after automatically testing the trailer for anti-lock or conventional brakes.

Yet another object of the present invention is to enable tractors and trailers equipped with the present invention to interconnect and function normally with conventional tractors and trailers of past and future manufacture.

An additional object of the present invention is to provide for ease of installation and low initial installation and maintenance costs.

A further object of the present invention is to reduce or eliminate the human error factor in properly connecting an anti-lock trailer to the tractor unit equipped with the present invention hence obtaining maximum safety benefits by automatically testing and properly connecting the tractor power source to the anti-lock trailer.

Another object of the present invention is to enhance the overall public safety by enabling the more efficient continuous operation of the anti-lock brake system.

Yet another object is to encourage the skeptical trucking industry to more readily accept anti-lock brake equipped trailers because of a safer mode of operation by virtue of the electronic control unit (ECU) being under continuous power and able to continually self-diagnose itself and display a fault warning light previous to moving the vehicle or depressing the tractor brake pedal.

SUMMARY OF THE INVENTION

In general, on tractor trailers equipped with anti-lock brake systems, the anti-lock system is powered from the brake light circuit of the trailer. In Applicant's previously cited pending application Ser. No. 07/886,252, Applicant discloses an anti-lock brake powering system that can be manually engaged with the positioning of a cab mounted switch means to provide continuous power to the trailer brake light circuit contained within a six or seven way cord and plug configuration used to supply power from the tractor unit to the trailer for the purpose of continuously energizing the anti-lock brake system so as to enhance the operating safety and reliability factors of the anti-lock system. In said pending application, no provision was made for determining whether the trailer connected to the tractor was equipped with anti-lock or conventional brakes. The operator must know the type of brake system with which the trailer is equipped before the cab mounted switch means can be properly positioned. If a trailer with a conventional brake system were to be connected to a tractor equipped with the Applicant's pending system, and the cab mounted switch means was put in the anti-lock brake position, then the brake lights of the conventional brake trailer would be energized continuously thereby presenting a safety hazard on the highways.

In the present invention, when a trailer is connected to the tractor unit, the coil of a first relay is temporarily disposed in the trailer brake light circuit to test for the presence of a trailer by virtue of a current flow into either the electronic control unit (ECU) of an anti-lock brake trailer equipped with an additional pressure switch disposed in the brake light circuit rearward of the ECU power tap or into the brake light filaments of a conventional brake trailer. When current of a minimal value flows through the coil of the first relay, indicating connection to a trailer, contacts of the first relay close and the coil of a second relay, shunted by a parallel resistor, becomes temporarily disposed in the trailer brake light circuit and will then be capable of flowing current of a higher magnitude, such as would be required by brake light filaments of a conventional brake trailer, to test for the presence of a conventional brake trailer. If the second relay operates within a predetermined time period, indicating a higher current draw and the presence of a conventional brake trailer, then contacts of the second relay close energizing and holding on a third relay whose contacts will close and supply power to the trailer brake light circuit from the tractor mounted brake light pressure switch and will operate the trailer brake lights in the conventional manner. If the second relay fails to operate within a predetermined time period, indicating less current draw than would be required by a single brake light filament and thereby identifying the trailer as an anti-lock trailer, then a fourth relay will energize and hold closed a set of contacts that will supply continuous power to the trailer brake light circuit hence energizing the anti-lock brake system continuously on an anti lock trailer. The brake lights of the anti-lock brake trailer will then operate through an additional pressure switch located on the trailer brake relay valve that will respond to air pressure from the tractor air brake foot pedal.

Because the present invention requires the holding on of certain relays to accordingly supply power to the trailer brake light circuit, provision must be made to ensure that the test circuit of the present invention is reset each time a different trailer is connected. This is accomplished automatically with the use of a pressure switch located on the trailer protection valve and a fifth and sixth relay circuit configured to produce a momentary power supply interruption to the test circuit of the present invention. This momentary interruption will enable the held on relays to drop out. Upon restoration of power, the present invention will retest the presently connected trailer and reestablish the proper brake light circuit power supply connection.

Releasing the emergency brakes on a trailer is a universal procedure that must be performed before the trailer can be moved and is accomplished by applying air pressure to the emergency brake chambers through the trailer protection valve. By locating a pressure switch on the trailer protection valve outlet port, a reliable signal source is established to operate the momentary interruption circuit of the present invention each time a different trailer is connected to the tractor unit. Automatic testing and connecting will also minimize operator error when the type of trailer is unknown.

While most if not all newer tractor units are of a negative ground polarity, many of the older tractor units are of a positive ground polarity. Therefore nonpolar electrical components are employed in this design to ensure complete compatibility of tractor and trailer vehicles regardless of vehicle ground polarity.

As a safety feature, a bypass switch completely disconnects the present invention from the trailer brake light circuit and reconnects the tractor mounted brake light pressure switch power supply circuit to restore conventional operation to trailer brake lights.

DETAILED DESCRIPTION OF THE DRAWING

Figure 1:
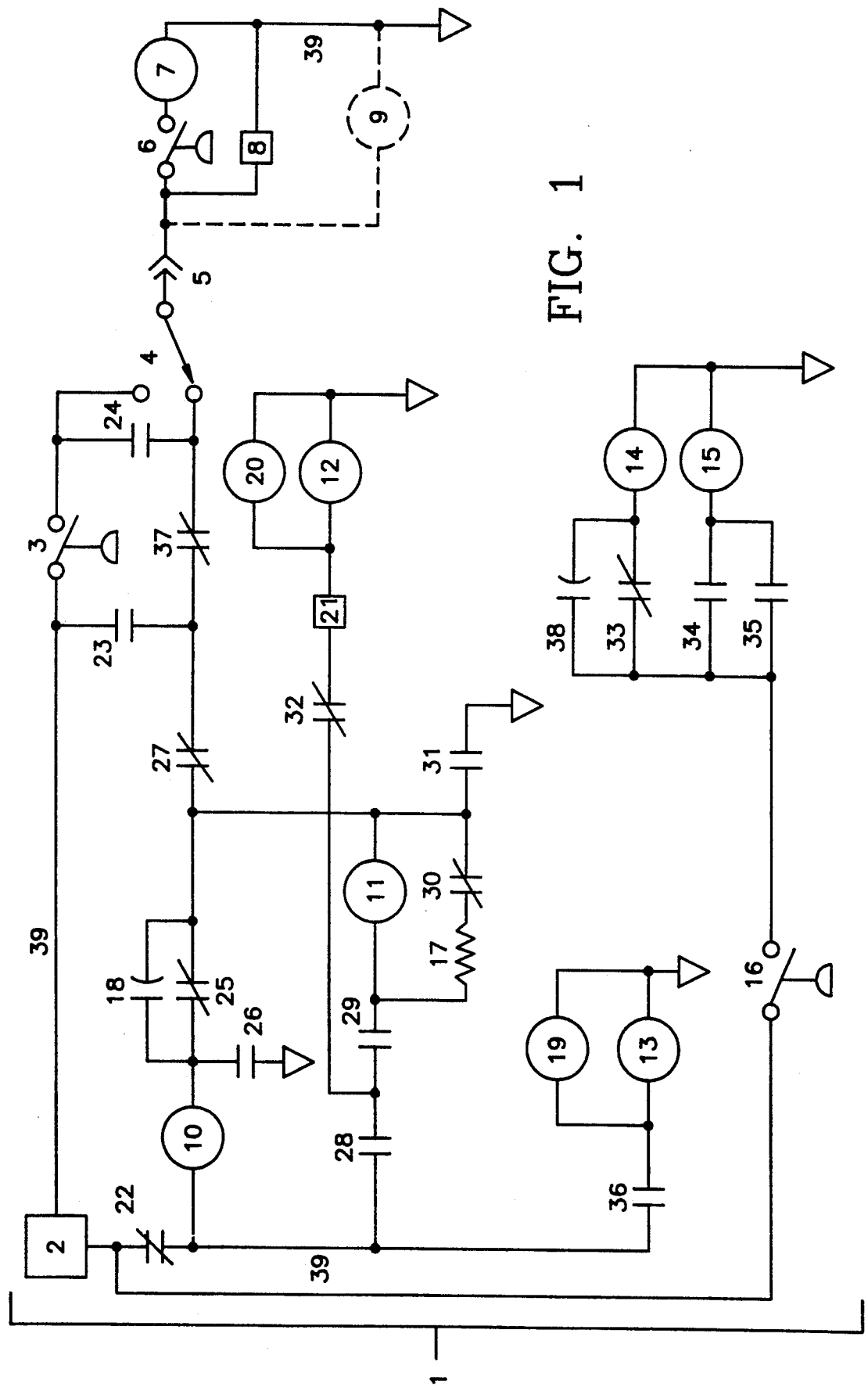
FIG. 1 is a schematic diagram of the electrical circuit of the invention.

Reference is now made to the drawing wherein the present invention is illustrated in detail and wherein the components bear reference numerals.

FIG. 1 is a schematic diagram of the preferred embodiment of the invention and illustrates an automatic test and connect electrical powering system 1 for trailers equipped with anti-lock or conventional brakes comprising an electrical power source 2 disposed in the tractor, pressure switches 3 and 16 disposed in the tractor, switch means 4 disposed in the tractor, cord and connecting means with multiple circuits 5 disposed between the tractor and trailer, pressure switch 6 disposed in the anti-lock brake trailer relay valve, brake light 7 disposed in the anti-lock brake trailer, electronic control unit (ECU) 8 disposed in the anti-lock brake trailer, brake light 9 disposed in the conventional brake trailer, relays 10 through 15 disposed in the tractor, resistor 17 disposed in the tractor, capacitors 18 and 38 disposed in the tractor, indicator lamps 19 and 20 disposed in the tractor, delay module 21 disposed in the tractor, relay contacts 22 through 37 disposed in the tractor, and wiring 39 disposed in the tractor and trailer.

DESCRIPTION OF THE PREFERRED EMBODIMENT

Referring now to FIG. 1 a schematic diagram of the invention, the preferred embodiment of the present invention is shown as it would be installed in a tractor, trailer equipped with a conventional brake system and a trailer equipped with an anti-lock brake system modified with pressure switch 6 disposed in the brake light circuit between the ECU 8 power tap and brake lights 9.

In general, the present invention employs a current level sensing circuit comprising a current path from 12 volt DC power source 2, through normally closed (NC) contacts 22, 12 volt 75 milliamp DC relay 10, NC contacts 25, NC contacts 27, NC contacts 37, switch means 4, cord and connector means 5, and wiring 39, so that when the cord and connector means 5 is connected to an anti-lock brake or conventional brake trailer a complete circuit to ground will be established through either the electronic control unit 8 of an anti-lock brake trailer or through the brake light filaments 9 of a conventional brake trailer enabling a test current to flow at a low level through the electronic control unit 8 or a higher level through the brake light filaments 9. Test current flowing at either the low or the higher level will energize relay 10 causing NC contacts 25 to open and normally open (NO) contacts 26 to close holding in relay 10 while simultaneously disconnecting relay 10 from the testing circuit. 50 microfarad non-polar capacitor 18 begins charging when NC contacts 25 open and provides a momentary current flow through relay 10 to enable relay 10's armature to fully transfer NO contact 26 thereby ensuring the holding in of relay 10 preventing relay 10 from cycling on and off. With holding in of relay 10, NO contacts 28 and 29 close energizing 12 volt DC relay 11 and through NC contacts 32, energizes 250 millisecond time delay module 21. Relay 11, shunted by parallel 6.5 ohm resistor 17 in series with NC contacts 30, will energize only if test current flows at a higher level through the brake light filaments 9 of a conventional brake trailer. Immediately upon sensing the higher level current flow, relay 11 will energize opening NC contacts 30, disconnecting shunt resistor 17, and closing NO contacts 31 holding on relay 11. NC contacts 32 open deenergizing time delay module 21 and NO contacts 36 close energizing 12 volt DC relay 13 and indicator lamp 19 indicating the presence of a conventional brake trailer. Upon energizing of relay 13, NC contacts 37 open disconnecting test circuit from the trailer brake light circuit and NO contacts 24 close supplying power from power source 2 through pressure switch 3 to the trailer brake light circuit to operate the trailer brake lights 9 in the conventional manner. If test current flows at the lower level, relay 11 will not energize and time delay module 21 will operate and energize 12 volt DC relay 12 and indicator lamp 20 indicating the presence of an anti-lock brake trailer. Upon energizing relay 12, NC contacts 27 open disconnecting test circuit from the trailer brake light circuit while closing NO contacts 23 thereby supplying continuous power from power source 2 to the trailer brake light circuit hence operating the electronic control unit 8 continuously and the brake lights intermittently through pressure switch 6.

Because of the holding in of relays 10 and 11, the present invention must be reset or momentarily deenergized and reenergized to insure that each trailer that is connected to a tractor equipped with the present invention is automatically tested and properly connected to tractor power source 2. Thus, an automatic reset function comprising power source 2, pressure switch 16, 12 volt DC relays 14 and 15, 50 microfarad non-polar capacitor 38, relay contacts 22, 33, 34 and 35, and wiring 39 operates upon and responsive to the pressurizing of the trailer emergency brake chambers. When the trailer emergency brake chambers are pressurized, NO contacts of pressure switch 16 disposed on the trailer protection valve, close flowing current from power source 2 through wiring 39 and NC contacts 33, energizing relay 14 thereby opening NC contacts 22 deenergizing test circuit and closing NO contacts 35 and energizing relay 15. NO contacts 34 close holding in relay 15 while NC contacts 33 open deenergizing relay 14 thereby closing NC contacts 22 and reestablishing current flow to the test circuit. Capacitor 38 begins to charge through coil of relay 14 when contacts 33 open and provides for a delayed release time for relay to insure sufficient reset time the test circuit.

In the event of a malfunction of the present invention, a bypass circuit is provided wherein the bypass circuit comprises power source 2, wiring 39, pressure switch 3, switch means 4, and cord and connector 5 so that when switch means 4 is on one position current flows from power source 2 through wiring 39, NC contacts 22, coil of relay 10, NC contacts 25, 27 and 37, NO contacts 23 or 24 (when closed), switch means 4, and cord and connector 5 into trailer brake light circuit to operate accordingly the ECU 8 brake lights 7 of an anti-lock trailer or brake lights 9 of a conventional trailer and so that when switch means 4 is in a second or bypass position, current flows from power source 2, through wiring 39, pressure switch 3, switch means 4, and cord and connector 5 into trailer brake light circuit and provides for conventional operation of trailer brake lights at all times. While switch means 4 is in the bypass position, the present invention is completely disconnected from the trailer brake light circuit.

What is claimed:

1. An automatic test and connect electrical power system for use on a tractor having a power source and a cord and connecting means with multiple circuits providing power from the tractor to a trailer or trailers wherein one of the circuits is a brake light circuit to sense the presence of and properly connect power to a trailer or trailers equipped with either a conventional brake system or an anti-lock brake system and having a pressure sensitive switch disposed in the trailer brake light circuit in the tractor responsive to air pressure in the brake lines of the tractor so that when the brakes of the tractor are applied power flows from the power source through the trailer brake light circuit and pressure sensitive switch disposed in the tractor and through the trailer brake light circuit of the cord and connecting means and the brake light circuit and brake lights of the trailer or trailers equipped with either a conventional brake system or an anti-lock brake system, comprising an electrical power source disposed in the tractor, a switch means disposed in the tractor, a cord and connecting means with multiple circuits disposed between the tractor and trailer or trailers, a pressure switch disposed in an anti-lock brake trailer relay valve, an electronic control unit disposed in the anti-lock brake trailer, or trailers, brake lights disposed in an anti-lock brake trailer or trailers, brake lights disposed in a conventional brake trailer or trailers, six relays disposed in the tractor, a resistor disposed in the tractor, two capacitors disposed in the tractor, a delay module disposed in the tractor, sixteen relay contacts disposed in the tractor, and wiring disposed in the tractor and trailer or trailers, so that when the cord and connector means is connected to anti-lock brake or conventional brake trailer or trailers a complete circuit to ground is established through either the electronic control unit of an anti-lock brake trailer or trailers or through the brake lights of a conventional brake trailer or trailers thereby enabling a test current to flow at a low level the electronic control unit of the anti-lock brake trailers or trailers or at a higher level through the brake lights of a conventional trailer or trailers which test current flowing at either level will energize a first relay causing a first set of contacts to open and disconnect the first relay from the test circuit and begin to charge a first capacitor parallel connected across the first set of contacts which charging current ensures the first relay's armature to fully transfer and close a second set of contacts that will hold on the first relay and so that a third and fourth set of contacts will close disposing a second relay in the test circuit and simultaneously, through a fifth set of contacts, will energize a time delay module so that the second relay, having a resistor in series with a sixth set of contacts connected across its coil acting as a current shunt, will energize only if a sufficiently higher current flow is sensed whereupon the sixth set of contacts will open disconnecting the second relay current shunt and closing a seventh set of contacts thereby holding on the second relay while simultaneously opening the fifth set of contacts deenergizing the time delay module and closing an eighth set of contacts energizing a third relay and a first indicator lamp thereby indicating the presence of a conventional brake trailer or trailers and so that a ninth set of contacts open disconnecting the test circuit from the trailer brake light circuit while simultaneously closing and holding on a tenth set of contacts thereby supplying power from the power source through the first pressure switch, the tenth set of contacts, the switch means, and the cord and connector means to the trailer brake light circuit to operate the brake lights of a conventional trailer or trailers and so that if the test current continues to flow at the low level the second relay will not operate and the time delay module will time out, energize and hold on a fourth relay and a second indicator lamp indicating the presence of an anti-lock brake trailer or trailers whereupon an eleventh set of contacts will open disconnecting test circuit from trailer brake light circuit while simultaneously closing a twelfth set of contacts thereby supplying continuous power from the power source through the twelfth set of contacts, the switch means, and the cord and connector means to the trailer brake light circuit, electronic control unit, a second pressure switch and the brake lights of an anti-lock brake trailer or trailers whereupon the electronic control unit will operate continuously and the brake lights will operate through the second pressure switch disposed in the anti-lock trailer brake relay valve responsive to trailer air brake pressure and so that upon pressurizing a third pressure switch disposed in the trailer protection valve, a fifth relay energizes opening a thirteenth set of relay contacts thereby deenergizing the first and/or second relays and effectively resetting the test circuit while simultaneously closing a fourteenth set of contacts thereby energizing a sixth relay that opens a fifteenth set of contacts that begins to charge a second capacitor parallel connected to the fifteenth set of contacts which delays release of the fifth relay and closes a sixteenth set of contacts to hold on the sixth relay ensuring sufficient release time for the first and/or second relays whereupon deenergizing the fifth relay closes the thirteenth set of contacts hence reenergizing the test circuit for testing successive trailers and so that when the switch means is in one position current flows from the power source through the thirteenth set of contacts, the first relay, first set of contacts, eleventh set of contacts, ninth set of contacts, tenth or twelfth set of contacts, switch means, and cord and connector means into the trailer brake light circuit to operate accordingly the electronic control unit and brake lights of an anti-lock brake trailer or trailers or brake lights of a conventional brake trailer or trailers and so that when the switch means is in a second position or bypass position current flows from the power source through the first pressure switch, switch means, cord and connector means, and into the trailer brake light circuit and provides for conventional operation of the trailer brake lights while simultaneously disconnecting the present invention from the trailer brake light circuit.

2. The automatic test and contact electrical power system of claim 1 wherein the connecting means between the tractor and trailer or trailers is a seven way cord and plug configuration.

3. The automatic test and contact electrical power system of claim 1 wherein the connecting means between the tractor and trailer or trailer is a six way cord and plug configuration.

* * * * *